(12) United States Patent
Hart

(10) Patent No.: US 7,862,004 B2
(45) Date of Patent: Jan. 4, 2011

(54) GAS ELIMINATING CONTROL VALVE

(75) Inventor: Burton L. Hart, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 147 days.

(21) Appl. No.: 11/462,583

(22) Filed: Aug. 4, 2006

(65) Prior Publication Data

US 2007/0090318 A1    Apr. 26, 2007

Related U.S. Application Data

(60) Provisional application No. 60/706,081, filed on Aug. 5, 2005, provisional application No. 60/795,301, filed on Apr. 26, 2006.

(51) Int. Cl.
*F16K 31/02* (2006.01)

(52) U.S. Cl. .............................. 251/129.17; 251/129.15

(58) Field of Classification Search ............ 251/129.15, 251/129.17; 222/129.1
See application file for complete search history.

(56) References Cited

U.S. PATENT DOCUMENTS

| | | | |
|---|---|---|---|
| 2,842,400 A * | 7/1958 | Booth et al. ................ | 239/569 |
| 3,743,240 A * | 7/1973 | Merriner et al. ........ | 251/129.17 |
| 4,046,351 A | 9/1977 | Lang | |
| 4,262,877 A | 4/1981 | Lang | |
| 4,286,767 A | 9/1981 | Hashimoto | |
| 4,295,631 A | 10/1981 | Allen | |
| 4,376,447 A * | 3/1983 | Chumley ..................... | 137/244 |
| 4,732,362 A | 3/1988 | Moroika et al. | |
| 4,832,313 A | 5/1989 | Hashimoto et al. | |
| 4,930,747 A | 6/1990 | Nakamura | |
| 5,118,072 A | 6/1992 | Sakamoto et al. | |
| 5,213,303 A | 5/1993 | Walker | |
| 5,333,643 A | 8/1994 | Gilchrist et al. | |
| 5,386,849 A | 2/1995 | Gilchrist et al. | |
| 5,630,403 A * | 5/1997 | Van Kampen et al. ....... | 123/520 |
| 6,505,812 B1 | 1/2003 | Anastas | |
| 6,688,577 B2 | 2/2004 | Abbott | |

* cited by examiner

*Primary Examiner*—John K Fristoe, Jr.
(74) *Attorney, Agent, or Firm*—Barnes & Thornburg LLP

(57) ABSTRACT

A gas eliminating control valve assembly, system and method is disclosed. The valve system includes a valve casing coupled to a solenoid actuator assembly. The valve casing includes an inlet conduit, an outlet conduit and a fluid chamber communicating at least with one inlet conduit and one outlet conduit. The outlet conduit communicates with the fluid chamber at a position at least adjacent a portion of the fluid chamber to conduct gases, bubbles or separated gas out of the fluid chamber during operation of the valve open fluid flow, such that gas entrapment and bubble formation within the fluid chamber is reduced, avoided or eliminated.

4 Claims, 6 Drawing Sheets

GAS ELIMINATING CONTROL VALVE

RELATED APPLICATION

This application claims the priority of U.S. Provisional Patent Application Nos. 60/706,081 filed on Aug. 5, 2005 and 60/795,301 filed Apr. 26, 2006 the complete disclosures of which are hereby expressly incorporated by reference.

BACKGROUND

The present disclosure relates to a system for eliminating or reducing entrapment of gases in fluid control valves. Particularly, the present disclosure relates to solenoid control valves adapted to conduct fluids and reduce or eliminate entrapment of gases within the control valve. More particularly, the disclosure relates to a solenoid control valve assembly configured to reduce or eliminate collection of gases within the valve casing, thereby reducing or eliminating flow rate decay caused by trapped gas bubbles.

In another aspect, the present disclosure relates to a system for producing beverages which includes controlling dispensing water from the system for use in brewing. The water in the system is conducted through a line which includes a controllable inlet valve adapted to conduct fluids and reduce or eliminate entrapment of gases within the control valve.

Conventional control valves, particularly solenoid actuated control valves, are used in many structures to regulate the flow of fluids. They are direct acting by means of an electrically activated coil/plunger assembly lifting a spring loaded diaphragm or pin that generally engages a stationary valve seat. The electrically activated coil/plunger assembly operates a sealing member (diaphragm or pin) between a valve closed position engaged with a fluid supply or outlet line, and a valve open position spaced from the fluid supply or outlet line.

Generally, conventional valves are utilized as a two-way normally closed valve with flow from a side inlet to a bottom outlet. While designed to be operated in a vertical position with the solenoid coil on top, they may be operated horizontally if required.

Conventional control valves suffer from a drawback, particularly when used to control heated fluids such as hot water. Fluids, particularly heated fluids, often contain entrained gases that may accumulate and become trapped in the valve cavity of a control valve, thereby forming a trapped bubble. A trapped bubble occupies a portion of the volume within the valve cavity, thereby reducing the volume available for fluid conduction through the valve. The reduction in conducting volume, i.e. flow rate, reduces the ultimate flow rate and volume through the valve.

A reduction of flow rate caused by trapped gases is particularly problematic for applications requiring precise volumes regulated by the valve, such as in food and beverage dispensing machines (i.e., coffee, tea, soda, soup, etc.). Reduction of control precision can result in inconsistency in making a recipe. For example, lack of precision in a brewing recipe can result in inaccurate brewing extraction and inconsistent flavor characteristics. More over, entrapment of gas bubbles in the valve is inconsistent such that the volume of water blocked by a trapped bubble is not predictable and therefore adds another level of variability to the process. In many beverage dispensing applications, a low vertical profile is desired, thus requiring control valves to be placed in a horizontal configuration that may exacerbate entrapment of gases.

Thus, a control valve is desired that reduces or eliminates the entrapment of gas bubble and the attending loss of flow rate. A control valve assembly that reduces or eliminates the entrapment of gas bubbles and that has a low vertical profile is particularly desirable.

DETAILED DESCRIPTION

Figure 1:
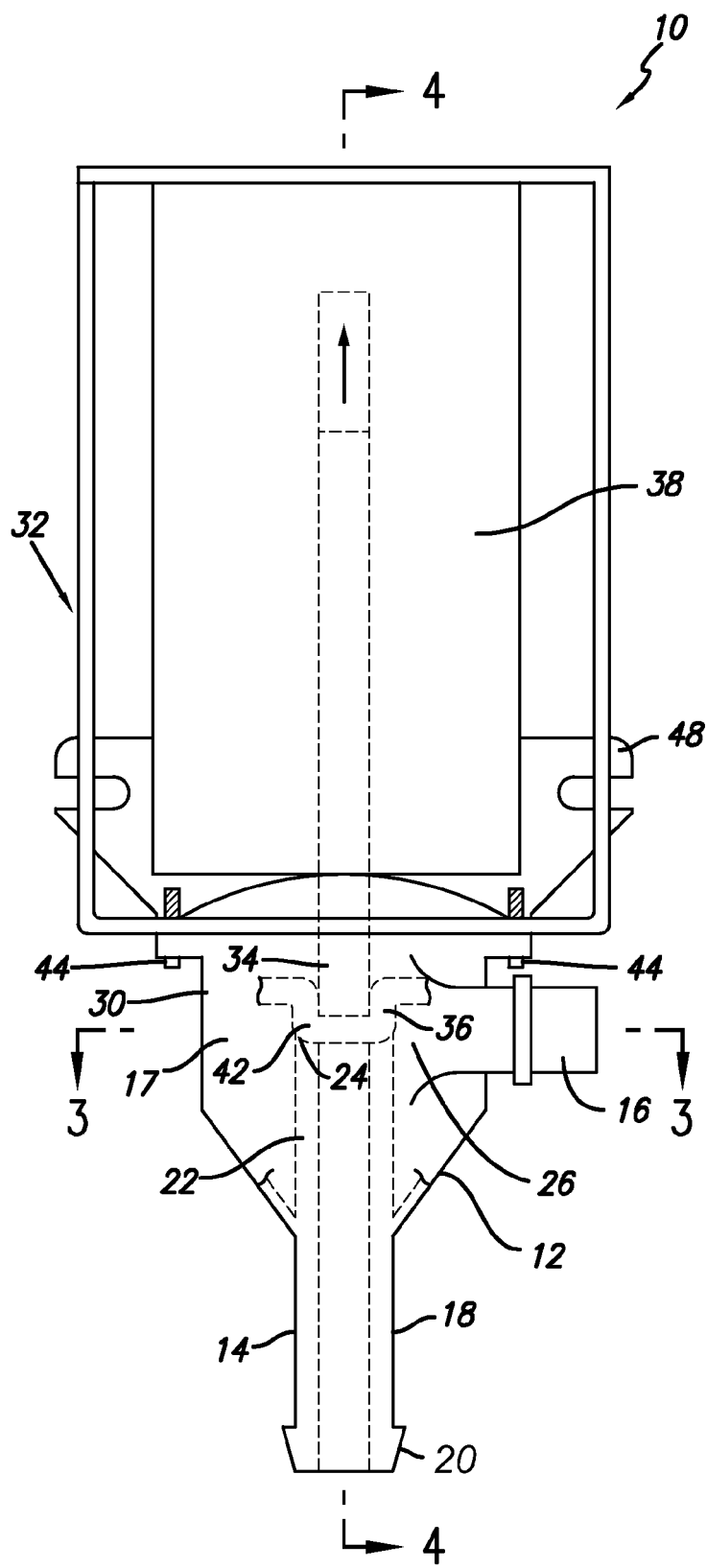
FIG. 1 is a top view of a gas eliminating control valve assembly according to the present disclosure.
Figure 2:
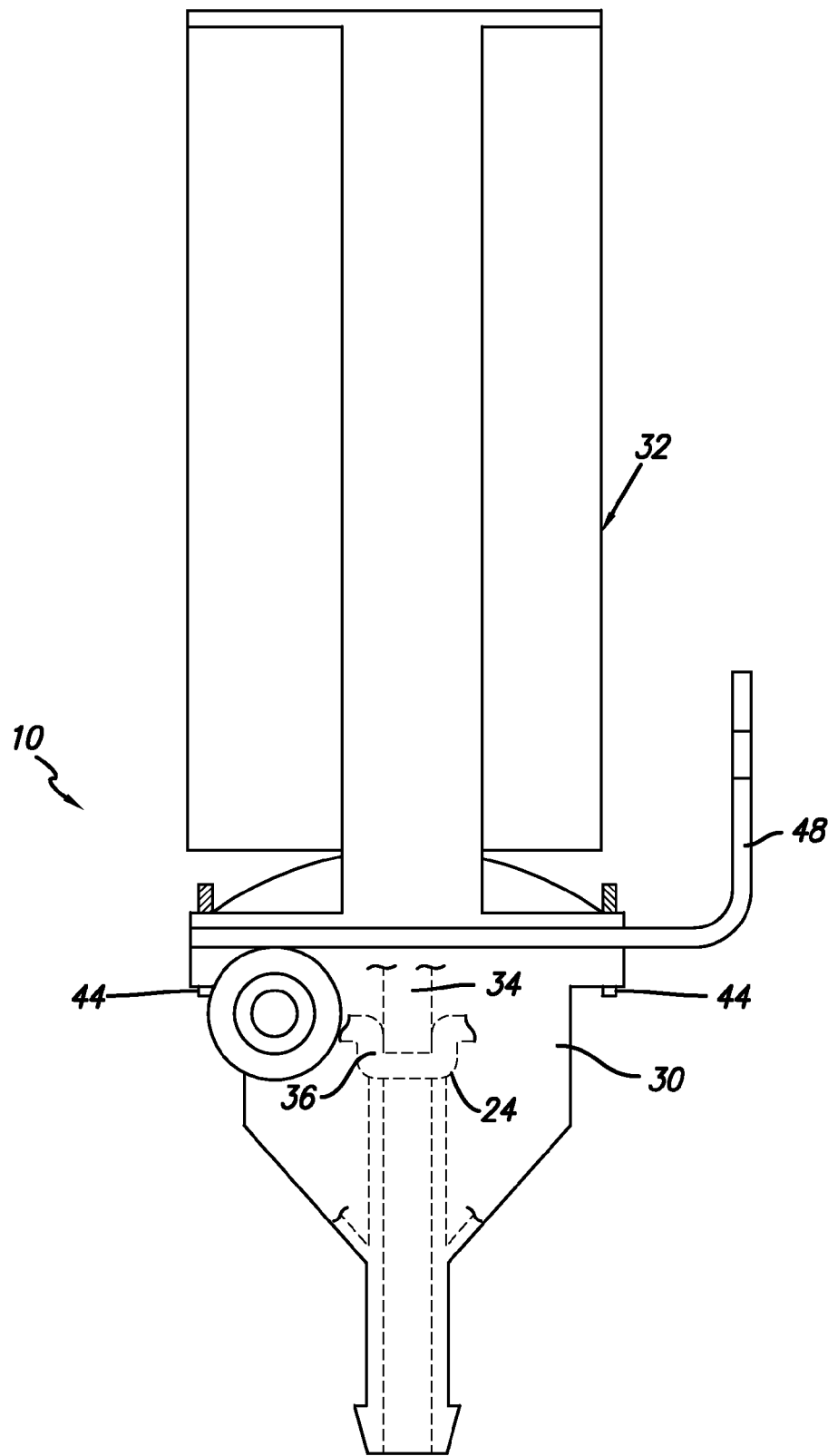
FIG. 2 is a side view of a according to the present disclosure viewed towards an outlet conduit.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

With reference to the drawings, there is seen in FIG. 1 a solenoid control valve assembly 10. The solenoid control valve assembly 10 includes a valve casing 12 defining an inlet conduit 14, an outlet conduit 16 and a fluid chamber 17 communicating with each of the inlet conduit 14 and outlet conduit 16, and a solenoid actuator assembly 32. The inlet conduit 14 includes an exterior portion 18 extending from the fluid chamber 17 outwardly, and may include an annular retaining barb 20 on an outer surface thereof to assist a fluid conducting tube (not shown) in maintaining engagement with the inlet conduit 14. The inlet conduit 14 further includes an interior portion 22 communicating with the exterior wall 18 to form inlet conduit 14, the interior wall 22 extending inwardly into fluid chamber 17 and terminating in a stationary valve seat 24.

Figure 3:
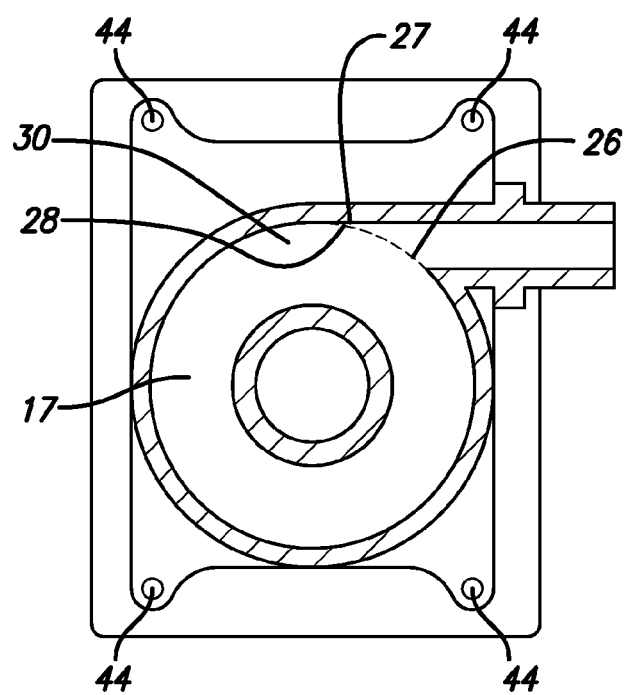
FIG. 3 is a cross-sectional view of the gas eliminating control valve assembly according to the present disclosure of FIG. 1 taken along line 3-3.

As illustrated in FIGS. 1 and 3, the outlet conduit 16 extends outwardly from the fluid chamber 17, and preferably has a longitudinal axis at a 90° angle to an inlet conduit longitudinal axis, although other angles and configurations are within the scope of this disclosure and are within the sill of the ordinary artisan. The outlet conduit may include an annular line stop 19 to provide a means for the outlet conduit 16 to communicate with the fluid chamber 17 at a junction 26 providing fluid communication between the fluid chamber 17 and the outlet conduit 16. The junction 26 is positioned such that when the solenoid control valve assembly is in a desired mounting arrangement, the junction 26 has a highest point 27 at least adjacent a highest portion 28 of the fluid chamber 17. As best seen in FIG. 3, the junction 26 is preferably at least partially coextensive the highest elevation within the fluid chamber 17, as shown. Any gas bubbles that may form in an upper region 30 of the fluid chamber 17, such as may happen when heated fluids flow through and gasses evolve or when heated fluids are allowed to cool within the fluid chamber 17 during periods of inactivity thereby allowing entrained gases to evolve, are swept from the fluid chamber 17 and discharged through the outlet conduit 16 during the next cycle or cycles of operation. As the volume of gas that evolves from the fluid is unpredictable, another uncontrollable, unpredictable variable is introduced to the system. The present disclosure reduces or eliminates this variable.

One of the benefits of the disclosed control valve 10 (FIG. 3) is that it may provide a low vertical profile, i.e. a minimal vertical height, while reducing or eliminating the entrapment of gases. Such a configuration allows the control valve 10 to be incorporated into applications requiring a low profile, such in the limited space in automated beverage dispensing systems. Another benefit is reducing or eliminating another variable in the disbursing of heated fluids, such as water for a food or beverage dispenser. The reduction or elimination of gas bubble accumulation from the valve adds more consistency and control to the dispensing process. By improving the consistency and control, the precision of the associated water flow is improved. Improving the precision of the water flow can be important to improving the consistency, precision and repeatability of a beverage recipe. For example, when brewing coffee, improving the consistency of the volume of water that is used in the brewing process can improve the consistency of the extraction and resulting flavor of the brewed coffee. This example is intended to provide one illustration or a benefit of this disclosure and is not intended to be limiting as to other benefits of this disclosure, whether known or unknown at the time of application.

Figure 4:
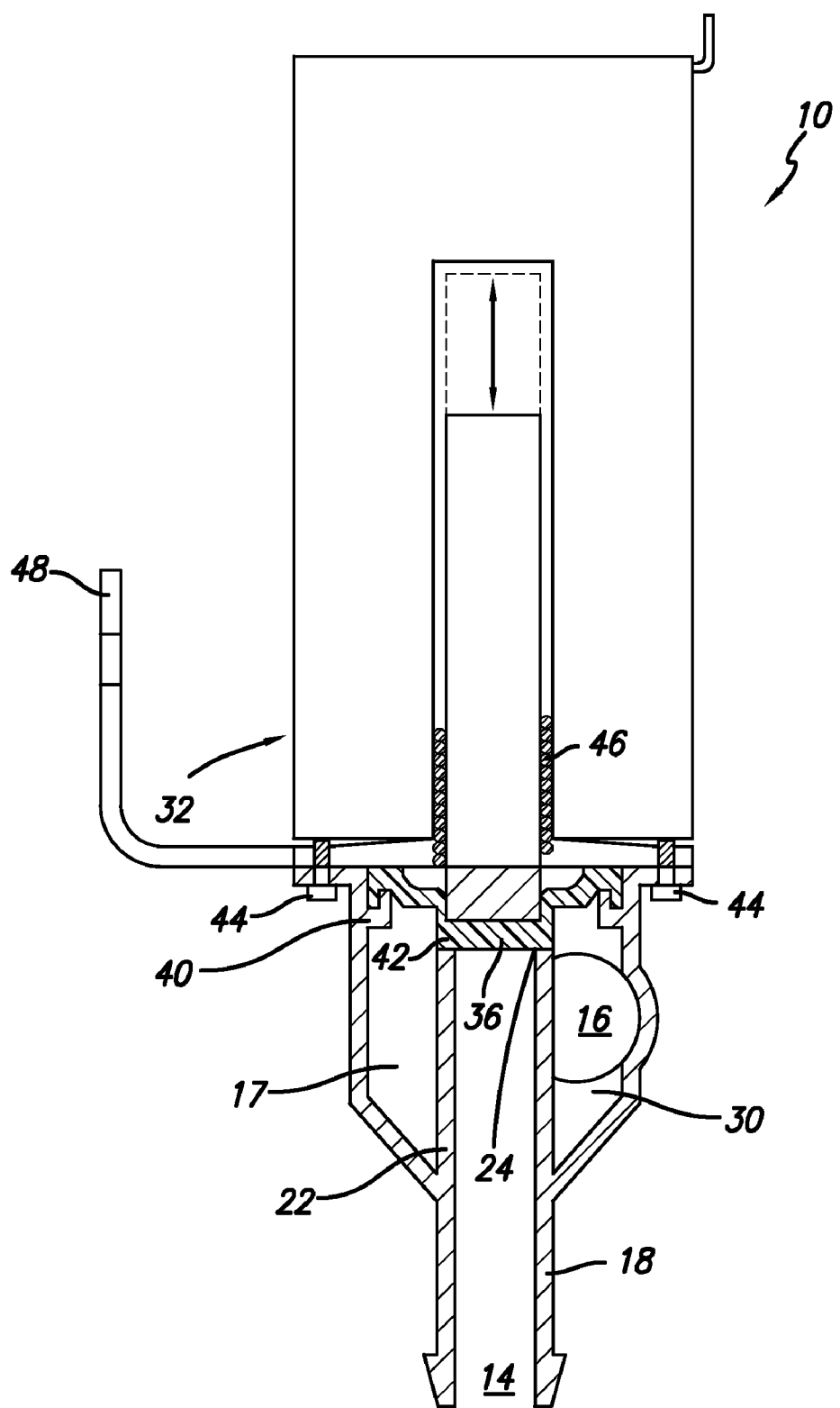
FIG. 4 is a cross-sectional view of the gas eliminating control valve assembly of FIG. 1 taken along line 4-4.

The valve casing 12 is coupled to the solenoid actuator assembly 32 via a plurality of fasteners 44, and generally includes a plunger 34 (shown in phantom in FIG. 1), a valve member 36 (shown in phantom in FIG. 1) and a solenoid 38 for supplying a magnetic flux to the plunger 34. The valve member 36 preferably comprises a disk-shaped elastic member or diaphragm sealingly coupled to the casing 12 at an inner circumferential portion 40 thereof. The valve member 36 includes a center portion 42 for engaging and disengaging with the valve seat 24. A biasing member 46, shown in FIG. 4 as a coil spring, is mounted in the solenoid actuator assembly 32 to bias the plunger 34 to a desired position (e.g., valve normally open or valve normally closed). A mounting bracket assembly 48 is provided to enable the control valve assembly to be mounted to an adjacent structure.

The plunger 34 is coupled to the valve member 36 on a side opposite the valve seat 24, and is moveable, in relation to the solenoid when the solenoid is electrically excited, to position the valve member 36 in a valve seat engaging position (valve closed) or a position spaced from the valve seat (valve open) depending on the desired normally open or normally closed operation design. Although the construction of the solenoid actuator assembly has been generally described herein, a person of ordinary skill in the art will appreciate that a variety of solenoid actuator designs may be utilized that operates a valve member between an open and closed position.

Figure 5:
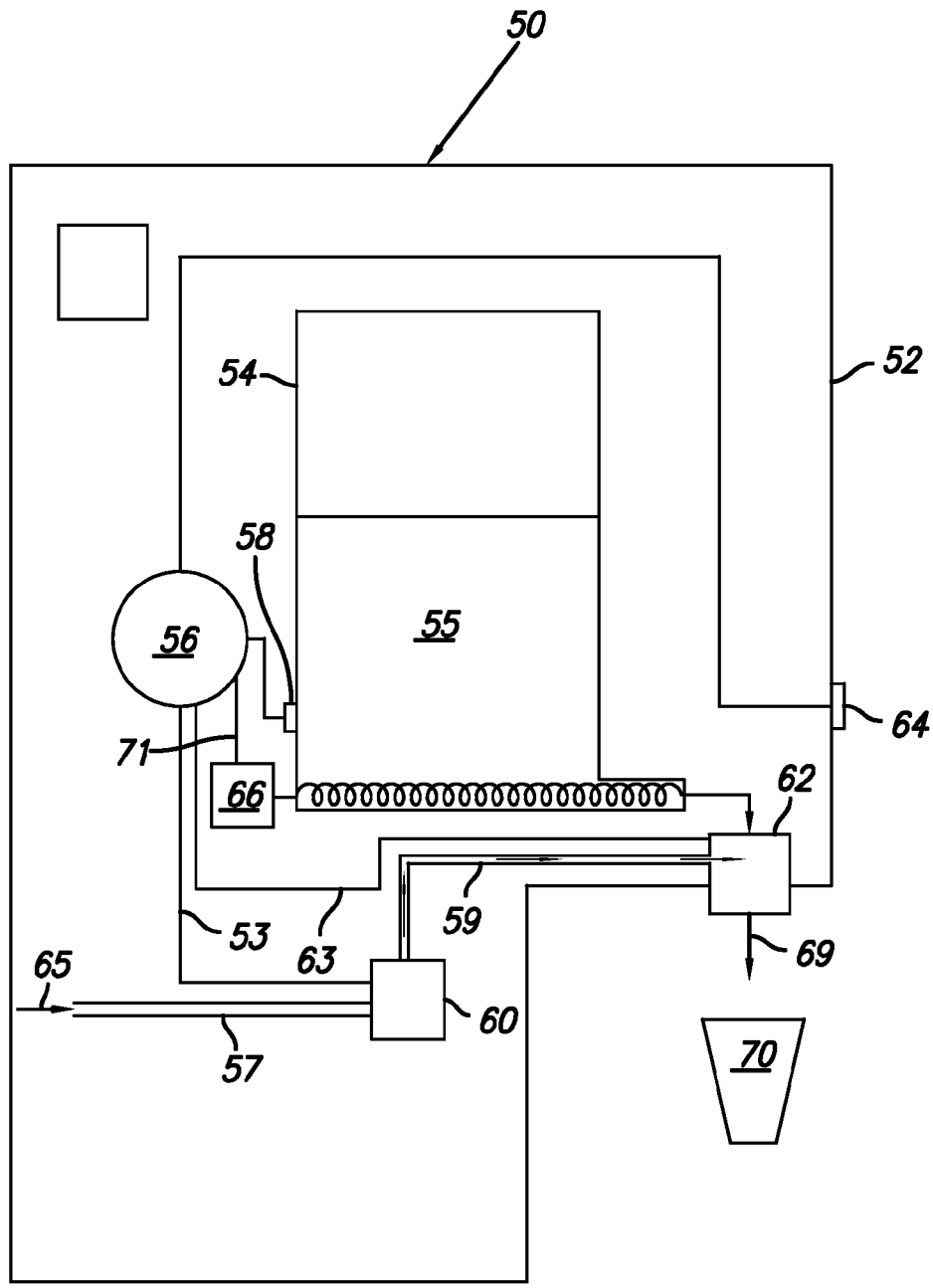
FIG. 5 is a diagramatic side view of a beverage dispensing system according to the present disclosure.

Referring to FIG. 5, one embodiment of a beverage dispensing system 50 according to the present disclosure includes a housing 52 which contains a container or hopper 54, a controller 56, a sensor assembly 58, a motor 66, an auger 68, a gas eliminating solenoid valve 60, mixing assembly or apparatus 62, and switch 64. The sensor assembly 58 and controller 56 define an apparatus 57 for detecting a level of beverage material 55 in beverage dispenser 50. This example is intended to be illustrative of one embodiment of the valve in use. This example is not intended to be limiting of uses of the valve, whether known or unknown at the time of this application.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

In general, the system operates when switch 64 is activated to initiate a dispensing cycle in which water 65 controllably passing through gas eliminating solenoid valve 60 is mixed with beverage material 55 in mixing assembly 62. The dispenser 50 dispenses a beverage 69 to a corresponding cup or container 70. When powdered concentrate is used, an auger 68 is operated by a motor 66 in response to a signal from controller 56 to rotate for a given period of time or number of rotations to dispense a proportional amount of powder into mixing assembly 62. Controller 56 also operates gas eliminating solenoid valve 60 associated with a water distribution system to combine beverage material 55 and water 65 in mixing assembly 62 and dispense a resultant beverage therefrom. The gas eliminating solenoid valve 60 is configured according to the description of control valve assembly 10 described above. The valve 60 includes a similar inlet conduit that communicates with inlet water line 57 and an outlet conduit that communicates with water outlet line 59. Sensor assembly 58 is coupled to controller 56 for detecting the level of beverage material 55 in hopper 54.

The mixing apparatus 62 combines the material 55 dispensed from the hopper 54 with water 65 which has been allowed to pass through the gas eliminating solenoid valve 60 under control of the controller 56 over line 53. The controller 56 is controllably connected to the mixing apparatus by means of the line 63 and connected to the controllable motor 40, which operates the auger 68, via line 71. The mixing apparatus might also include other devices for agitating or otherwise mechanically combining the water 65 and the material 36a dispensed from the hopper 24.

Figure 6:
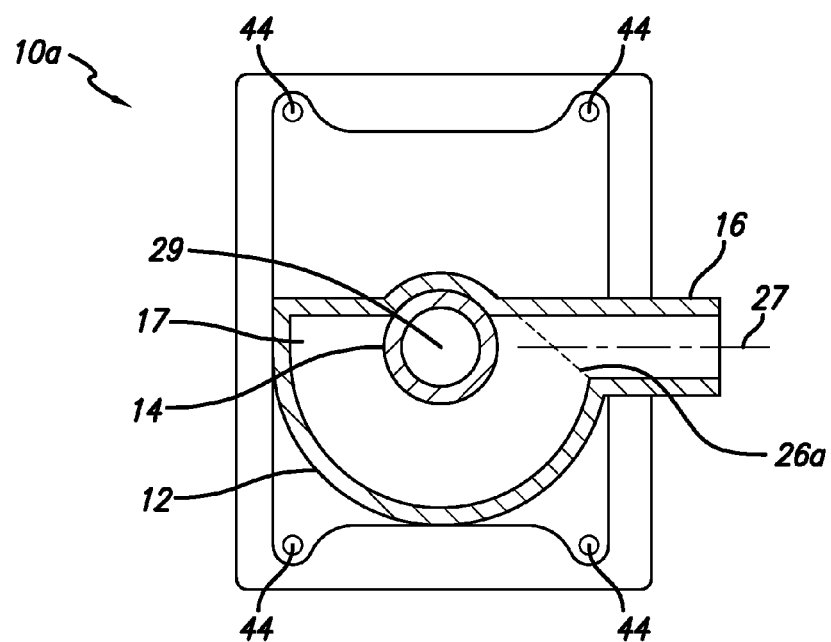
FIG. 6 is a diagramatic cross-sectional view of another embodiment of the gas eliminating control valve assembly of the present disclosure.

With reference to FIG. 6, another embodiment of the solenoid control valve assembly 10a is shown. In FIG. 6, the junction 26a has been modified so that there is no raised area relative to the inlet conduit 14. As a result, the axial center line 27 of the outlet conduit 16 is generally coincident with a center line 29 of the inlet conduit 14. As a result any bubbles that my normally be caught in the stream and trapped in an upper area of the prior art are moved along the generally coincident paths 29, 27. While the structure is shown in FIG. 3 eliminates the accumulation of gas by controlling the upper region 30 of the fluid chamber 17 the embodiment as shown in FIG. 6 eliminates the upper region. As such fluid flowing from the inlet conduit into the chamber 17 flows out through the outlet conduit 16.

Further examples of beverage dispensing systems in which the gas eliminating solenoid control valve assembly of the present disclosure may be used are shown in U.S. Pat. No. 5,927,553 issued Jul. 27, 1999; U.S. Pat. No. 6,155,158 issued Dec. 5, 2000; U.S. Pat. No. 5,623,574 issued Apr. 22, 1997; U.S. Pat. No. 6,446,835 issued Sep. 10, 2002 and U.S. Pat. No. 6,726,062 issued Apr. 27, 2004; each of which are assigned to the assignee of the present application and all of which are incorporated herein by reference. The gas eliminating solenoid control valve of the present disclosure may be incorporated into any application where a controllable solenoid valve is contemplated.

While various aspects of the disclosure are herein described in combination with drawings, it is envisioned that those skilled in the art may devise various modifications and equivalents without departing from the spirit and scope of the disclosure. The disclosure is not intended to be limited by the foregoing detailed description.

What is claimed is:

1. A selectively controllable gas eliminating control valve system comprising:
   a valve casing having an inlet conduit, an outlet conduit, a fluid chamber communicating with the inlet conduit and the outlet conduit, and a junction communicating between the outlet conduit and the fluid chamber;
   a control assembly operatively associated with the valve casing for controlling the flow of fluid through the valve, the control assembly including an axially operated solenoid plunger and the inlet conduit being axially aligned with the solenoid plunger, the outlet conduit being generally perpendicular to and axially offset from the inlet conduit;
   the inlet conduit, outlet conduit, fluid chamber and junction defining a fluid flow path;
   the fluid chamber receiving fluid through the inlet conduit, fluid exiting the chamber through the outlet conduit, the junction generally continuously connecting the chamber merging with the outlet conduit without any recesses; and
   wherein the junction is formed adjacent a portion of the fluid chamber for allowing gas to be eliminated through the outlet conduit to avoid accumulation of gas in the fluid flow path.

2. A selectively controllable gas eliminating control valve assembly including:
   a valve casing defining a fluid chamber and including an inlet conduit and an outlet conduit respectively communicating with the fluid chamber with a junction being defined between the outlet conduit and the fluid chamber;
   the inlet conduit, outlet conduit, junction, and fluid chamber defining a fluid flow path;
   a control assembly operatively associated with the valve casing for controlling the flow of fluid through the valve, the control assembly including an axially operated solenoid plunger and the inlet conduit being axially aligned with the solenoid plunger, the outlet conduit being generally perpendicular to and axially offset from the inlet conduit;
   the fluid chamber receiving fluid through the inlet conduit, fluid exiting the chamber through the outlet conduit, the junction generally continuously connecting the chamber and merging with the outlet conduit without any recesses; and
   wherein the outlet conduit is positioned such that the outlet conduit communicates with the fluid chamber for allowing gas to flow though the fluid flow path and be eliminated through the outlet conduit to avoid accumulation of gas in the fluid flow path.

3. A beverage dispensing system including:
   apparatus for mixing beverage material and liquid for producing a beverage;
   a selectively controllable solenoid valve for controllably dispensing fluid for mixing with the beverage material;
   the controllable solenoid valve having a valve casing including an inlet conduit, at least one outlet conduit communicating with a fluid chamber defining at least a portion of a fluid flow path for conducting fluid therethrough;
   a junction communicating between the outlet conduit and the fluid chamber;
   a control assembly operatively associated with the valve casing for controlling the flow of fluid through the valve;
   the control assembly including an axially operated solenoid plunger and the inlet conduit being axially aligned with the solenoid plunger, the outlet conduit being generally perpendicular to and axially offset from the inlet conduit;
   the fluid chamber receiving fluid into the chamber and passing fluid through the outlet conduit, the junction generally continuously connecting the chamber and merging with the outlet conduit without any recesses; and
   the junction is positioned adjacent a portion of the fluid chamber for allowing gas to be eliminated through the outlet conduit communicating with the fluid chamber to avoid accumulation of gas in the fluid flow path; and
   a controller coupled to the controllable solenoid valve to controllably operate the controllable solenoid valve to facilitate dispensing a beverage.

4. A method of avoiding accumulation of generally separated gas in a fluid flow path in a controllable solenoid valve, the method comprising:
   providing a valve casing defining a fluid chamber and including at least one inlet conduit and at least one outlet conduit communicating with the fluid chamber;
   the inlet conduit, outlet conduit and fluid chamber defining a fluid flow path;
   orienting the controllable solenoid valve in a position for use with a highest portion of an upper region of the chamber merging with the outlet conduit;
   allowing gas to rise into the highest portion of the upper region;
   providing a control assembly operatively associated with the valve casing for controlling the flow of fluid through the valve;
   providing the control assembly with an axially operated solenoid plunger and the inlet conduit being axially aligned with the solenoid plunger, the outlet conduit being generally perpendicular to and axially offset from the inlet conduit;
   providing a junction with a continuous communication path between the outlet conduit and the fluid chamber without any recesses;
   controllably operating the solenoid plunger in the control assembly to allow fluid to pass into the chamber;
   receiving fluid through the inlet conduit into the chamber; and
   fluid exiting the chamber along the fluid flow path past the junction and through the outlet conduit with gas carried along in the flow of fluid through the flow path to the outlet conduit.

* * * * *